(12) United States Patent
Bauman et al.

(10) Patent No.: US 6,981,106 B1
(45) Date of Patent: Dec. 27, 2005

(54) SYSTEM AND METHOD FOR ACCELERATING OWNERSHIP WITHIN A DIRECTORY-BASED MEMORY SYSTEM

(75) Inventors: Mitchell A. Bauman, Circle Pines, MN (US); Douglas H. Bloom, White Bear Township, MN (US)

(73) Assignee: Unisys Corporation, Blue Bell, PA (US)

( * ) Notice: Subject to any disclaimer, the term of this patent is extended or adjusted under 35 U.S.C. 154(b) by 444 days.

(21) Appl. No.: 10/304,729

(22) Filed: Nov. 26, 2002

(51) Int. Cl.[7] ............................................. G06F 12/00
(52) U.S. Cl. ..................................... 711/146; 711/156
(58) Field of Search ..................... 711/136, 146, 151, 711/156, 158, 160; 710/40, 41; 345/535

(56) References Cited

U.S. PATENT DOCUMENTS 5,519,853 A * 5/1996 Moran et al. ............... 713/400
6,279,087 B1 * 8/2001 Melo et al. .................. 711/146
6,694,412 B2 * 2/2004 Frank et al. ................. 711/153
6,760,817 B2 * 7/2004 Arimilli et al. ............. 711/137

* cited by examiner

*Primary Examiner*—Pierre M. Vital
(74) *Attorney, Agent, or Firm*—Beth L. McMahon; Charles A. Johnson; Mark T. Starr (57) ABSTRACT

The current invention provides a system and method for managing data stored within a main storage device such as a main memory. In one embodiment, multiple requesters are coupled to the main storage device to store copies of ones of the data signals. A directory is coupled to the main storage device to store directory signals that describe the most recent copy of each the data signals. Another storage device is coupled to the directory to store a subset of the directory signals that describes a predetermined subset of the data signals. This subset of directory signals can be used to access any of the predetermined subset of the data signals in an accelerated manner.

45 Claims, 6 Drawing Sheets

SYSTEM AND METHOD FOR ACCELERATING OWNERSHIP WITHIN A DIRECTORY-BASED MEMORY SYSTEM

RELATED APPLICATIONS

The following co-pending applications of common assignee have some subject matter in common with the current application:

Ser. No. 10/304,919 entitled "System and Method for Providing Speculative Ownership of Cached Data Based on History Tracking", filed on even date herewith, and incorporated herein by reference in its entirety.

FIELD OF THE INVENTION

The present invention relates generally to shared memory multiprocessor systems, and more particularly to a system and method for accelerating ownership when a directory-based coherency mechanism is utilized to manage memory data.

BACKGROUND OF THE INVENTION

In many multiprocessor systems, all of the processors access a common memory, referred to as main memory. Typically, main memory is not capable of supplying data and instructions to multiple processors at adequate speeds. To compensate for the speed deficiencies of main memory, caches are usually incorporated. Caches are small high-speed memories located between main memory and a processor, and that are updated to contain memory data that was recently requested by the processor. The processor can generally obtain a copy of memory data much more quickly from its cache than from the main memory.

In multiprocessor systems, multiple copies of a particular data item may reside within multiple caches at any given time. Because of this, a memory coherency protocol must be used to ensure that all processors within the system operate from the same, most recent, copy of the memory data. This type of protocol allows data to be shared among many devices for read-only purposes. Before a device can modify the data, it must gain exclusive access to the data. In this case, all other cached copies of the data are marked as unusable, or "invalidated". After a device gains exclusive access to data, the device may, but is not required to, modify the data. When a device relinquishes exclusive access rights, any updated copy of the data must be stored back to the main memory, or provided to another cache within the system.

To implement a cache coherency protocol, some mechanism must be used to record the location and state of each cacheable unit of memory data. One mechanism for performing this type of data tracking involves use of a snoop filter. A snoop filter is a cache that is used to record the location of each copy of a unit of data that exists outside of the main memory. A record is created within the snoop filter as the copy is made, and is removed from the snoop filter when the copy is returned to the main memory. A snoop filter is generally large enough to contain entries for a subset of all units of data residing in the main memory. It does not include enough memory space to track every data unit at once.

One problem with snoop filters is that they are generally implemented as set addressable caches. As is known in the art, a set addressable cache can only store a limited number of blocks for a given set address. If all entries within a set address store valid blocks, data must be aged from the cache. When entries are aged from a snoop filter, however, the data unit that is tracked by that entry must be aged from cache back to main memory. This may severely impact system performance.

One way to address the problem associated with snoop filters is to use a memory directory. A memory directory provides a respective entry for each data unit that is stored within main memory. Thus, a memory directory tracks the location of even those data units that only reside within the main memory. A memory directory is therefore likely to be much larger than a snoop filter, and will generally require longer access time. This may slow processing throughput.

What is needed, therefore, is an improved system and method for implementing a coherency protocol in a multi-processor system.

SUMMARY OF THE INVENTION

The current invention provides a system and method for managing data stored within a main storage device such as a main memory. In one embodiment, multiple requesters are coupled to the main storage device to request copies of ones of the data signals. The requesters may include, for example, cache memories or any other type of storage devices. A directory is coupled to the main storage device to store directory signals that indicate the state and location of each of the data signals. The directory signals are used to ensure that each requester is using the most recent copy of the data.

In one embodiment of a data processing system that may employ the invention, the data signals are organized within the main storage device in addressable cache lines. The directory stores directory signals for each of the cache lines of data that are stored by the main storage device. These signals are used to determine the location of the most recent copy of the cache line within the data processing system.

According to the current invention, another storage device is coupled to the directory to store directory signals for a subset of the cache lines. In one embodiment, this additional storage device stores directory signals for those cache lines that are in one or more predetermined states. In a particular embodiment, the one or more predetermined states include an exclusive state that must be obtained by a requester that seeks to modify the data signals. The directory signals that are stored within the additional storage device are used to retrieve a most recent copy of the associated cache line in an accelerated manner as follows.

When a request for a cache line of data is made by one of the requesters to the main storage device, the address that is provided with the request is used to determine whether directory signals for the requested cache line are stored within the additional storage device. If so, these stored directory signals can be used to fulfill the request in a manner that can be completed more efficiently than if the directory signals were instead retrieved from the directory.

In one embodiment, each request that is issued to the main storage device is associated with a request type. Predetermined request types result in the issuance of one or more snoop requests, wherein a snoop request is a request issued by the main storage device to another requester within the system to prompt return of data so that the original request can be fulfilled. According to one aspect of the invention, only requests that are associated with one or more predetermined requests types, such as those request types that result in issuance of snoop requests, are submitted to the additional storage device for processing in the accelerated manner.

According to yet another aspect of the invention, the additional storage device for storing the subset of directory signals is a set addressable ownership cache. This set addressable ownership cache is addressed using a set address portion of the cache line address. Directory signals are aged from the ownership cache based on their relative ages and assigned priorities. According to still another aspect of the invention, directory signals are considered high priority if they are associated with cache lines that were exclusively owned by a first requester, and are subsequently transferred to another requester in the exclusive state. The ownership cache can provide the most benefit in reducing latency for requests associated with these types of cache lines.

According to one embodiment of the invention, a data processing system is provided that includes a first storage device to store data signals. At least two requesters are coupled to the first storage device to make requests for copies of ones of the data signals. A second storage device is coupled to the first storage device to store directory signals descriptive of the data signals. Acceleration logic is coupled to the second storage device to retain ones of the directory signals so that the time required to fulfill ones of the requests is reduced. The acceleration logic of one embodiment includes the ownership cache.

According to another aspect of the invention, a memory system is disclosed that includes a first storage device to store data signals. A second storage device is coupled to the first storage device to store directory entries, each entry indicating a state of respectively associated ones of the data signals. Acceleration logic is coupled to the second storage device to store state signals included within predetermined ones of the directory entries.

In still another embodiment of the invention, a method is provided for managing data signals that are stored within a first storage device. The method includes maintaining state information for each of the data signals, and storing predetermined portions of the state information within acceleration logic to reduce latency associated with accessing data signals that are associated with the predetermined portions of the state information.

Another aspect of the invention provides a data processing system that includes first storage means for storing data signals, and second storage means for storing directory signals describing states in which the data signals are stored. The system also includes requesting means for issuing requests to access ones of the data signals, and acceleration logic means for retaining a subset of the directory signals to be used in processing predetermined ones of the requests in an accelerated manner.

Other scopes and aspects of the current invention will become apparent from the following description and accompanying drawings.

DETAILED DESCRIPTION OF THE DRAWINGS

Figure 1:
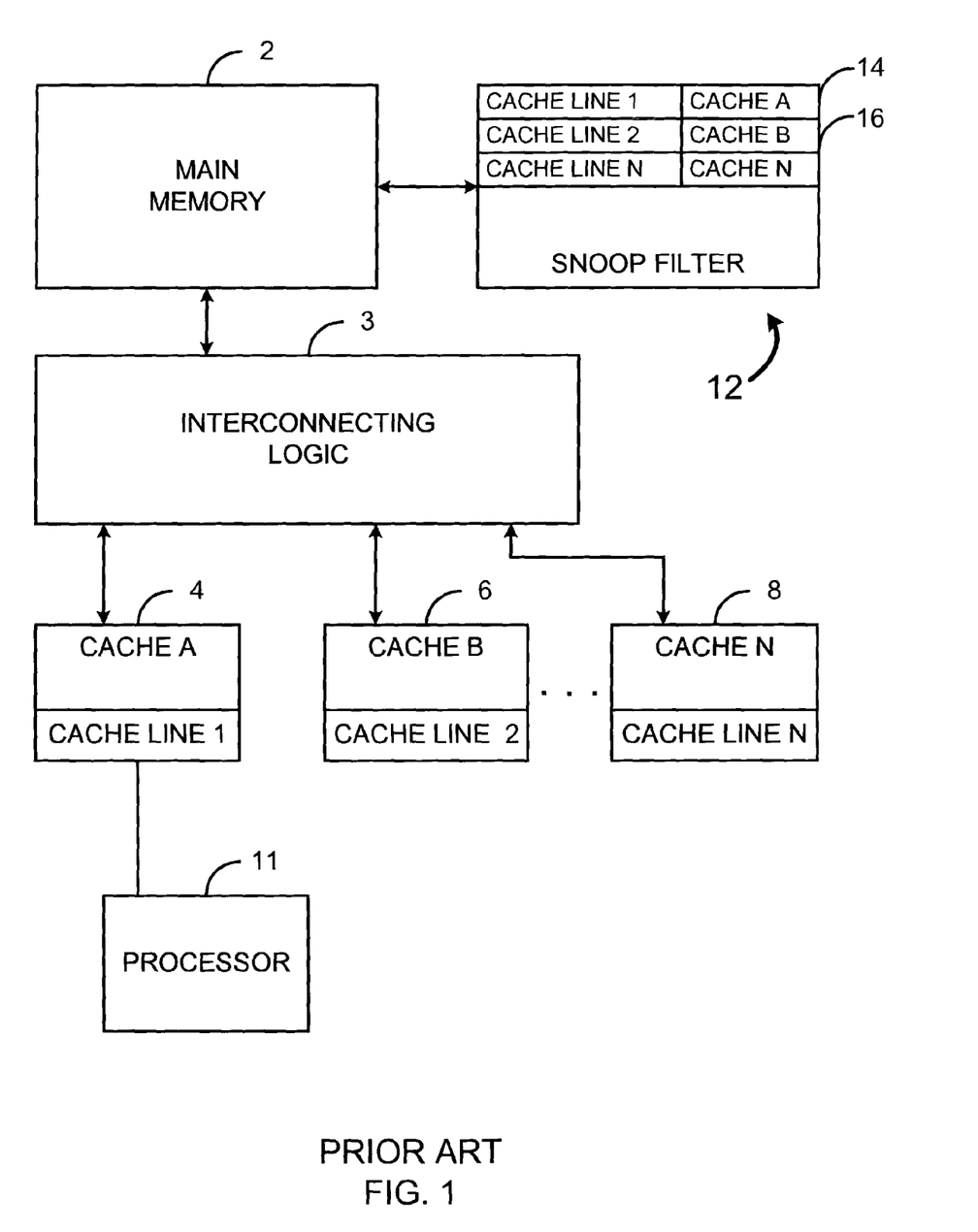
FIG. 1 is a block diagram illustrating a prior art method of maintaining memory coherency in a multi-cache system.

FIG. 1 is a block diagram illustrating a prior art method of maintaining memory coherency in a multi-cache system. The system includes a main memory 2 coupled via interconnecting logic 3 to multiple caches shown as caches 4, 6, and 8. Interconnecting logic 3 may provide bused interconnections, direct interconnections, and/or any other type of connection mechanism known in the art. Each cache in the system may be coupled directly or indirectly to one or more processors such as processor 11 shown interconnected to cache 4.

Main memory 2 is coupled to a snoop filter 12 that is utilized to maintain memory coherency. As discussed above, memory coherency involves ensuring that each processing entity within the system operates from the same, latest copy of the data stored within main memory 2. To do this, the location of each addressable unit of memory data, or "cache line", is tracked by snoop filter 12. Each time main memory 2 provides a cache line to one of caches 2 through 6, snoop filter records both the cache line address as well as the identity of the cache that is obtaining the cache line copy. In the illustrated example, snoop filter 12 stores an entry 14 indicating that cache A stores a valid, current copy of cache line 1. Similarly, entry 16 records that cache B stores a current copy of cache line 2, and so on.

If main memory 2 receives a request for a cache line that is already associated with an entry within snoop filter, the entry is used to determine whether the cache line must be retrieved from another cache before it may be provided to the requester. Then the entry is updated to record the new location of the cache line.

In many data processing systems, caches such as caches 4 through 8 are "set addressable". This means that each address used to reference the cache is divided into at least two portions: the "set address" and "block address". When an address is provided to reference the cache, the set address portion of this address is provided to a tag RAM (not shown) within the cache. This causes a predetermined number of other block addresses to be read from the tag RAM. Each of these block addresses is compared against the block address portion of the cache address. If the compare is favorable, a "cache hit" is said to have occurred, meaning the addressed cache line is stored within the cache, and the reference to cache may be completed. If the compare is not favorable, a "cache miss" has occurred, and the requested data must be obtained from some other memory within the system. When a cache line is stored within the cache, a new entry is created within the tag RAM by storing the block address of the cache line at the addressable location referenced by the set address.

As may be appreciated, a tag RAM will generally only be able to store a relatively small number of block addresses for a given set address. This number will depend on the width of the tag RAM. If most cache references are occurring to a relatively few set addresses, and a set address is used to address a large number of blocks, most references to a given set address will result in cache misses. When this occurs, previously-stored data must be flushed from cache to make room for the newly-requested data. This may result in memory thrashing, wherein cache lines are repeatedly stored, then flushed, from cache. This reduces system throughput.

Like many data caches, snoop filters such as snoop filter 12 are generally set addressable. Thus the same principles described above with respect to data cache references apply to those references involving snoop filters. That is, if a conservatively-sized snoop filter is employed, and if most memory references are targeted at a relatively small number of set addresses, the snoop filter may not contain enough entries to store all requested blocks. When this situation is encountered, entries must be flushed from the snoop filter, forcing one or more caches to flush all data associated with these entries back to main memory. This can severely impact performance. To avoid these types of worst-case scenarios, snoop filters are generally implemented using memories having a memory range that is at least two to three times larger than the cumulative memory range of all caches within the system. The design therefore occupies a large amount of silicon and printed circuit board real estate, consumes a considerable amount of power, and is expensive to implement.

An alternative type of system as compared to that of FIG. 1 employs a memory directory. A directory includes a respective entry for each cache line within the main memory. Any time a reference occurs to the main memory, the respective directory entry is updated to indicate the location of any newly-created copy of the cache line. This directory-type system can best be understood in reference to FIG. 2.

Figure 2:
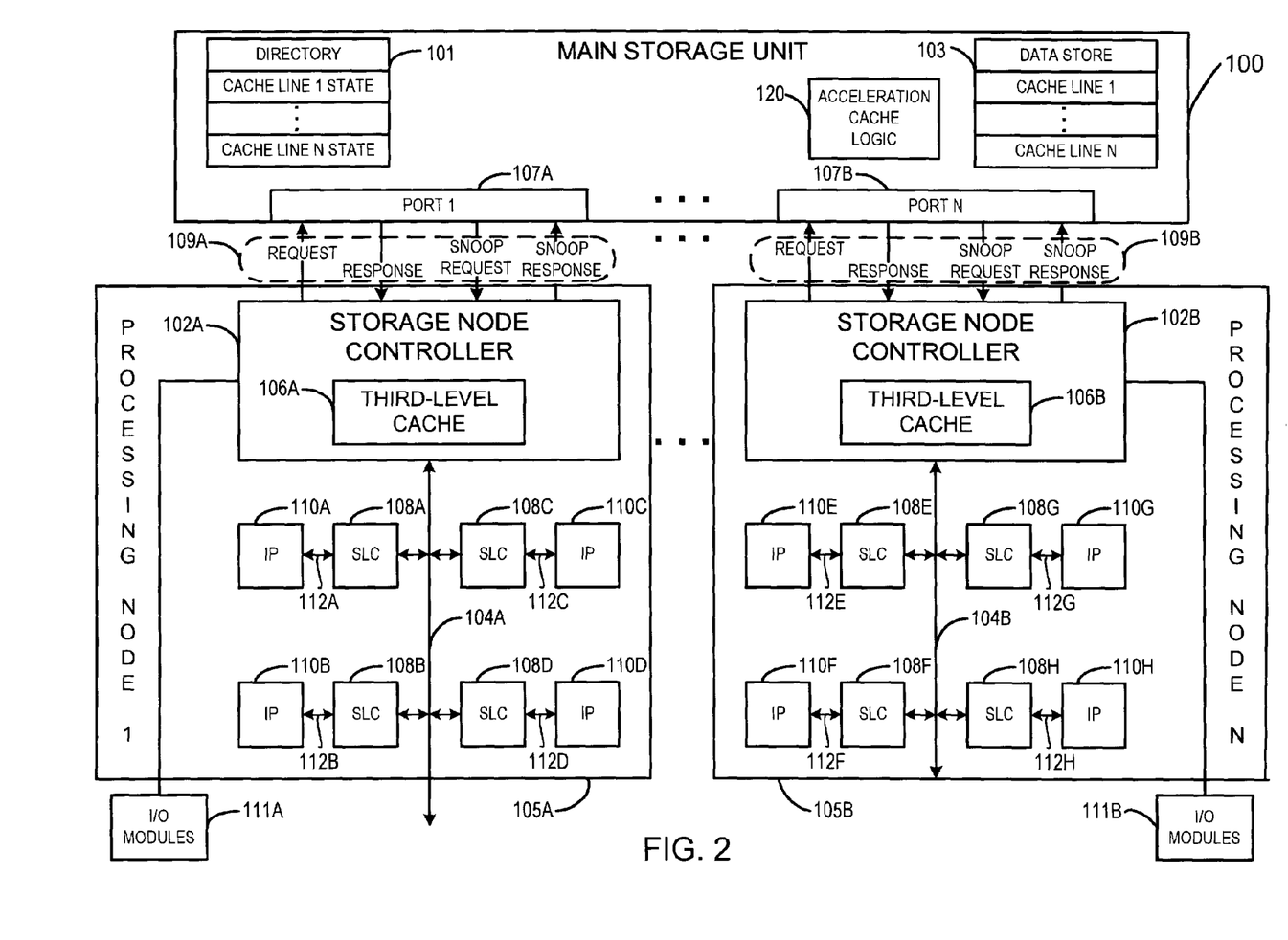
FIG. 2 is a block diagram of an exemplary data processing system that includes a memory directory.

FIG. 2 is a block diagram of an exemplary data processing system that includes a memory directory. The system includes a Main Storage Unit (MSU) 100 that provides the main memory for the system. Although the system of FIG. 2 includes only a single MSU 100, multiple MSUs may be provided, each being mapped to a portion of the system address space in a manner largely beyond the scope of the current application. MSU 100 may include Random Access Memory (RAM), Read-Only Memory (ROM), and/or any other type of memory known in the art.

In one embodiment, MSU is a directory-based storage unit similar to the system described in commonly-assigned U.S. patent application Ser. No. 09/001,598 filed Dec. 31, 1997 entitled "Directory Based Cache Coherency System Supporting Multiple Instruction Processor and Input/Output Caches", incorporated herein by reference. In this embodiment, MSU includes both a directory 101 and a data store 103. Data store 103 stores the data, including the instructions and operands, which may be referenced by any of the processors within the system. Directory 101 stores information that indicates where the latest copy of these data signals resides within the system to ensure that every processor is operating from this copy. As was discussed above, this is necessary since data from data store 103 may be copied into any of the various cache memories within the system.

In the current embodiment, each time a reference is made to data store 103, 128-bytes of data are read to, or written from, the data store. This unit of data is referred to as a cache line. Directory 101 includes a directory entry for each 128-byte cache line. Other embodiments may utilize cache lines of different sizes. The cache lines are shown within data store 103 as "cache line 1" through "cache line N". The respectively associated entries within directory 101 are shown as "cache line 1 state" through "cache line N state".

MSU is coupled to one or more processing nodes shown as processing node 1 105A through processing node N 105B. More or fewer processing nodes and memory ports may be included within the system. Each processing node is connected to a different memory port shown as port 1 107A through port N 107B, respectively, via dedicated high-speed interfaces 109A through 109B (shown dashed). Each of these interfaces has four sets of signals, including request, response, snoop request, and snoop response signals. The use of these signals will be discussed below.

Each processing node may also be coupled to an I/O complex, shown as I/O complexes 111A and 111B. Each of these I/O complexes contains one or more industry-standard or proprietary I/O modules that communicate with storage medium such as disk tape subsystems and communication equipment.

Each processing node includes a Storage Node Controller (SNC) shown as SNCs 102A and 102B for processing nodes 1 and N, respectively. Each SNC includes logic that interfaces with a respective high-speed MSU interface 109A or 109B, and further includes logic to interface to a respective one of processor buses 104A and 104B. Each SNC includes a respective ownership cache and all supporting logic. This cache may be a Third-Level Cache (TLC), a Fourth-Level Cache (4LC), or some other type of cache memory. In the embodiment shown, these caches are TLCs 106A and 106B. The ownership caches are discussed further below.

As noted above, each of SNCs 102A and 102B is coupled to a respective processor bus 104A and 104B. These processor buses can utilize any type of bus protocol. Each processor bus interfaces to multiple local cache memories. In the current embodiment, the local cache memories are shown as Second-Level Caches (SLCs) 108A–108H. In another embodiment, these local caches may be Third-Level Caches.

Each SLC 108 is coupled to a respective one of the Instruction Processors (IPs) 110A–110H over a respective interface 112A–112H. For example, SLC 108A is coupled to IP 110A via interface 112A, SLC 108B is coupled to IP 110B via interface 112B, and so on. The IP may be any type of processor such as a 2200™ processor commercially available from Unisys Corporation, a processor commercially available from Intel Corporation, or any other processor known in the art. Each IP may include one or more on-board caches. In the current embodiment, each IP may include a First-Level Cache (FLC). Preferably, each IP resides on a single Application Specific Integrated Circuit (ASIC) device with a respective SLC 108. Alternatively, an IP may be coupled to a respective SLC over an external interface.

In general, the caches within the processing nodes are ownership caches. As such, each cache maintains information that describes the state of each of the cache lines resident within the cache. A cache line may be in at least one of four mutually exclusive states, including a modified, exclusive, shared, or invalid state. These states are sometimes said to implement a "MESI" protocol.

When a cache line is stored in the modified state, the cache line copy has been modified, and is therefore the most up-to-copy of the cache line that resides within the system. All other copies of this cache line are said to be "stale", or outdated, and cannot be used, either for read-only or read/write purposes. At any given time, only one cache may store a copy of a particular cache line in the modified state. The cache that stores such a copy is said to "own" the cache line. If another processor requires use of the cache line, it must obtain the updated copy. Until another cache obtains the updated copy, the modified cache line copy may be used for read and/or write purposes.

When a cache line is retained in the exclusive state, the cache stores the latest cache line copy. Until this cache line is modified, the MSU also stores the latest copy of this data. At any given time, only one cache may store a valid copy of the cache line in the exclusive state. This cache line may be used for read and/or write purposes, and is said to be owned by the cache.

A cache line may further be stored within a cache in a shared state. In this case, the cache line is used for read-only purposes. The cache line may be stored in multiple caches within the system in the shared state. If another cache requests exclusive access to the cache line, all copies of that cache line that exist in the shared state must be "invalidated", or marked as unusable.

Finally, a cache line may reside within a cache in an invalid state. In this case, the cache line has been marked as unusable, and can not be used for read or write purposes. If a cache requires the use of an invalid cache line, it must obtain a valid copy from another memory within the system.

The manner in which memory requests are processed within the system can best be understood by example. Assume IP 110A requires read/write access to a cache line. IP 110A first attempts to retrieve the cache line from its internal cache(s) such as its FLC. If the cache line is not resident within the FLC, a request is sent to the respective SLC 108A. If the requested cache line is likewise not resident within the SLC, the SLC issues a request on the processor bus 104A. In one embodiment of the invention, each SLC implements a bus snoop protocol to monitor the processor bus for such requests. When the request is "snooped" by the SLCs 108B–108D, any SLC that retains the data in the requested state will return the data on processor bus 104A. Similarly, SNC 102A is snooping the bus for such requests. If TLC 106A stores the most recent copy of the cache line in the desired state, the cache line will be returned to the SLC 108A to be forwarded to IP 110A.

In some instances, data requested by IP 110A is not resident in the requested state within any of the cache memories associated with its processor bus 104A. In that case, SNC 102A uses the request signals of interface 109A to forward the request to MSU 100. The request signals include a cache line address, an identifier to indicate which processing node provided the request, and a transaction identifier for tracking multiple requests from a single node. If the request is of a type that includes data, the write data will also be provided by the request signals. The request signals further include a request type to indicate whether the processing node is requesting the cache line in the exclusive state so that read and write operations may be performed, or whether the cache line is requested in the shared state for read-only purposes. The various request types are discussed below. Finally, the request signals further provide a destination node identifier that is generated by SNC 102A by mapping the request address into the system address space. In an embodiment such as that mentioned above wherein MSU 100 is comprised of multiple memory units, this identifier indicates which of these units is to receive the request.

After receiving the request, MSU 100 determines the location and state of the most recent copy of the cache line using the cache line state information stored within its directory 101. In the current embodiment, directory 101 indicates that a cache line is in one of a number of predetermined states that include, but are not limited to, the following:

MSU Own;

Exclusive; and

Shared.

MSU Own State

All cache lines in the MSU are placed in the MSU own state after system initialization and before any cache lines have been copied into one of the system caches. This state indicates that the MSU has the most recent copy of the cache line. Since only the MSU is considered to have a valid copy of any cache line that is in the MSU own state, an error occurs if any SNC 102A issues a request to write to a cache line that is in this state.

Exclusive State

This state is described above in reference to the MESI protocol. When MSU 100 grants a copy of a cache line to a processing node for read and/or write purposes, directory 101 records the processing node's identity, and indicates the cache line is held in the exclusive state. Once a cache line is granted in an exclusive state, the copy retained by the MSU may not be provided to another processing node. If the MSU receives another request for the cache line while it is in this state, the MSU must retrieve the cache line copy from the owner by issuing a snoop request, as will be discussed below.

Shared State

This state is described above in regards to the MESI protocol. In this state, the cache line may reside within one, several, or all of the caches in the system at once for read-only purposes. The MSU is still considered to have a valid copy of the cache line, which may be provided to another cache for read-only purposes. Directory 101 records which one or more of the processing nodes have a valid copy of the cache line.

Returning to the current example, if the cache line were resident within MSU 100 in the MSU own state, MSU could provide this data directly to processing node 1 105A over the response lines of interface 109A. These lines include data signals, the original requester id, the transaction id, and a response type. The transaction id is the same as that included with the original request, and is used by the SNC 102A to match the request to the response. The response type indicates whether the cache line is being provided in the exclusive or the shared state. The MSU delivers the cache line in the state that was indicated on the request lines, which, in the current example, is the exclusive state. MSU further updates directory 101 to record that processing node 1 105A retains the cache line copy in the exclusive state.

The foregoing discussion assumes the cache line is available within MSU 100 in a state that allows its immediate return to the requester. Assume, instead, that the cache line state information stored within directory 101 indicates that the cache line is retained in the exclusive state by processing node N 105B. The MSU is therefore not able to provide the cache line directly to processing node 1 105A, but instead must issue a snoop request to node N to prompt the return of any updated cache line data to MSU 100.

A snoop request is issued to processing node 105B from port N 107B across the snoop request lines of interface 109B. These signals include a cache line address, a snoop type, a source and destination identifier, and a transaction tracking identifier. The snoop type indicates the type of snoop request being issued, the destination identifier indicates the processing node that is to receive the request, and the transaction tracking identifier is an identifier generated within MSU 100 that is used to later match a snoop response to the snoop request.

Upon receiving the snoop request, directory state information stored within TLC 106B is used to determine whether any of the SLCs 108E–108H has a copy of the data. If not, SNC 102B may return the cache line directly to MSU 100. This return of ownership and data is issued across the snoop response lines of interface 109B. The snoop response lines include cache data signals, response type signals, and the transaction-tracking id that was provided with the snoop request. If, however, any of the SLCs 108E–108H retains a copy of the cache line, SNC 102B issues a request to each of the SLCs 108E–108H via bus 104B requesting return of ownership and any modified data. This request is snooped by SLCs 108E–108H such that any of these SLCs having a valid data copy will invalidate that copy, and will further invalidate any copy stored by the associated FLC. If any one of these SLCs had acquired exclusive ownership of, and subsequently modified, the data, that modified copy is returned to SNC 102B during a "write back" operation. If the data is not modified, only ownership is returned. SNC 102B then returns ownership and, if necessary, modified data to MSU 100 using a snoop response, as discussed above.

After the snoop response is forwarded to MSU 100, MSU provides any returned data to processing node 1 105A over the response line of interface 109A and updates directory 101 in the manner discussed above. If data is not returned with the snoop response, the data is obtained from data store 103 and provided to processing node 1 105A. The manner in which this is accomplished is discussed further below.

When SNC 102A receives the cache line data, it provides this data in the exclusive state to requesting IP 110A via SLC 108A so that execution may continue. IP 110A and SLC 108A now own this cache line. State information within TLC 106A records that processing node 105A retains a copy of this cache line in the exclusive state.

As is apparent from the foregoing discussion, obtaining requested data may be time-consuming. In the foregoing example, IP 110A issues a request for an exclusive copy of data that is resident in SNC 102B or one of the associated SLCs 108E–108H. This request is fulfilled by invalidating the copies of data stored within processing node N 105B, then transferring the data from processing node N 105B to processing node 105A. The time required to complete these operations may be significant, especially during times when system interfaces are experiencing heavy traffic.

According to the current invention, the time required to fulfill a memory request is minimized by providing an ownership cache. An ownership cache is a small, fast memory that stores a subset of the directory state information contained within directory 101. An ownership cache and associated logic is implemented by acceleration cache logic 120 of FIG. 2, as will be discussed below in reference to the following figures.

Figure 3:
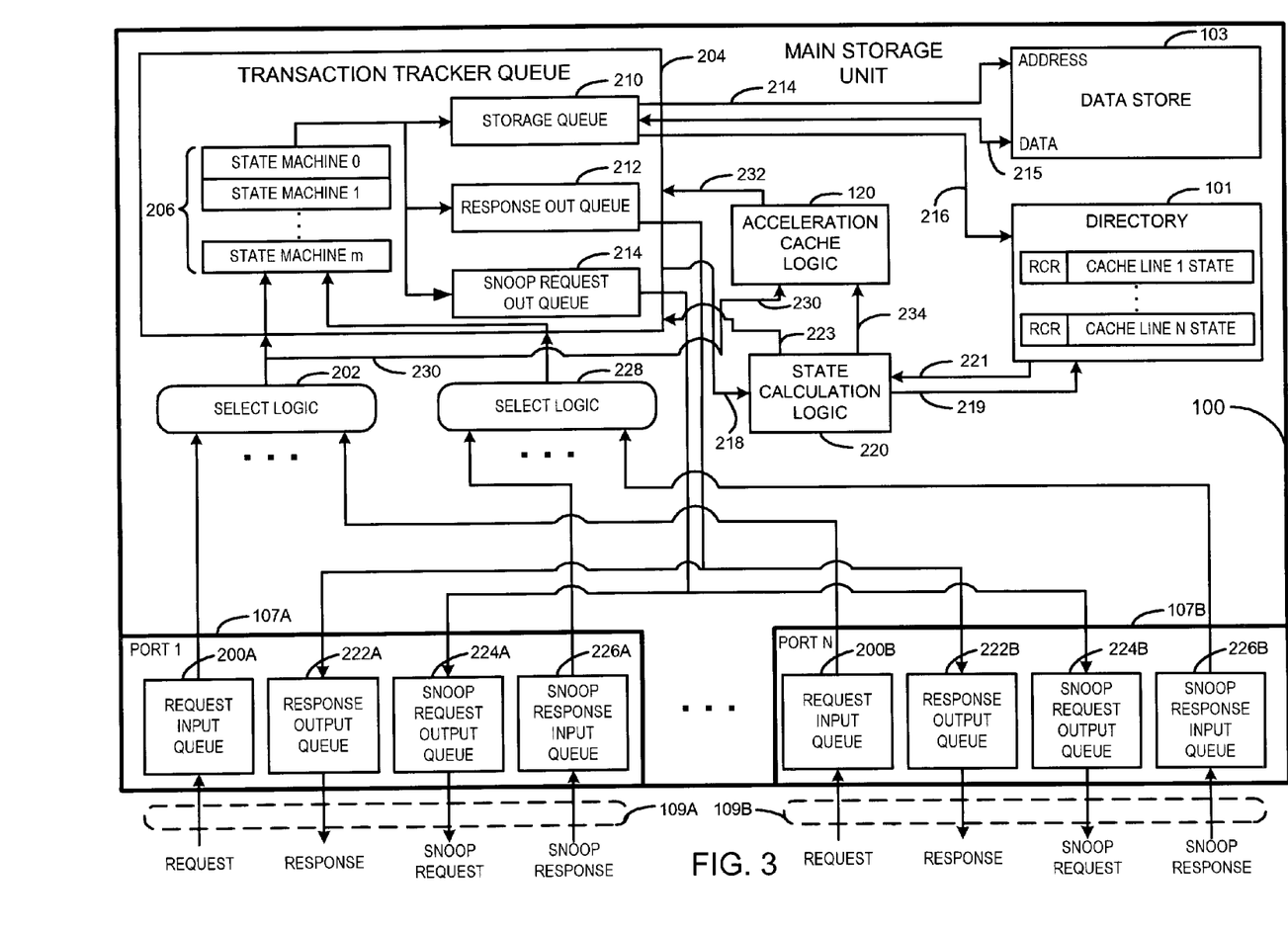
FIG. 3 is a more detailed view of the MSU.

FIG. 3 is a more detailed view of MSU 100. FIG. 3 includes acceleration cache logic 120 according to the current invention. This acceleration cache logic provides an accelerated mechanism for retrieving cache line state information for a requested cache line. This information may be used to retrieve cache line ownership and any modified cache line data from a previous owner so that data may be returned to a current requester more quickly. Before considering the manner in which acceleration cache logic 120 is utilized to fulfill requests to increase performance, the non-accelerated directory path is considered. In prior systems, this non-accelerated path is utilized to fulfill all requests as follows.

As discussed above, each processing node 105 is coupled to the MSU via a high-speed interface (shown dashed). Interface 109A connects processing node 1, 105A, to port 1, 107A of MSU 100. Similarly, interface 109B couples processing node N, 105B, to port N, 107B, of the MSU. Each of these interfaces includes request, response, snoop request and snoop response lines, as discussed above.

Each of the ports includes a respective request input queue. A request from a processing node is provided across interface 109 and is stored within the request input queue of the respective port. For example, a request that is provided by processing node 105A over interface 109A will be stored temporarily in request input queue 200A of port 1, 107A. Similar queues are included within each port. Each request input queue is capable of storing multiple requests that are waiting to be processed by MSU 100.

The request input queues may each provide a stored request to select logic 202. Select logic includes logic that selects one of the pending requests based on a rotational fairness algorithm. The selected request is then stored within Transaction Tracker Queue (TTQ) 204. In one embodiment, a new request may be stored within TTQ 204 each clock cycle.

The TTQ 204 includes multiple state machines 206 shown as state machine 0 through state machine m. A state machine is provided for each request that may be stored within TTQ 204. Each state machine is coupled to several queues, shown as storage queue 210, response out queue 212, and snoop request out queue 214. When a new request is stored within TTQ 204, the respective state machine is activated to track processing activities and to control the use of these TTQ queues for that request.

Upon activation of a state machine for a request, the state machine logic generates a request entry within storage queue 210 that includes a request address, request type, and any data provided with the request. The storage queue processes these request entries in a First-In, First-Out (FIFO) manner. When a request gains priority, the request address and any data are provided to data store 103 on lines 214 and 215, respectively. Also at this time, the request address is provided on lines 216 to directory 101.

When a request is provided to data store 103, a full cache line of data will be read from, or written to, data store based on the request type. In the mean time, the address on lines 216 reads the cache line state information for the addressed cache line from directory 101. This information is provided to state calculation logic 220 on lines 221, which forwards that information to TTQ 204 on lines 223 for use in fulfilling the request. This cache line state information is further used by state calculation logic 220 to determine the next cache line state for the cache line based, in part, on the request type provided by TTQ 204 on lines 218, and in some instances, on a Read Conditional Response (RCR) value that is stored with the cache line state information. State calculation logic 220 then writes the updated cache line state back to directory 101 on line 219. The calculation of cache line state information by state calculation logic 220 will be discussed in more detail below.

TTQ 204 uses state information in conjunction with the request type of the current request to determine whether a snoop request is necessary to fulfill the current request. In some cases, the response to the current request may be issued without generating additional snoop requests. This is the case, for example, when the request is a type that stores data to data store 103. In this instance, a response is provided to the requesting processing node indicating that the operation is completed. In another scenario, a snoop request is unnecessary when a requested cache line is to be returned in the shared state, and the cache line state information indicates the cache line is in the MSU own or shared state. In another case, a response may be returned to the requesting processing node immediately when a cache line is to be returned in the exclusive state, and the MSU owns the cache line. In still another scenario, the requested cache line may be returned immediately if the directory state indicates that cache line is already owned by the requesting processing node. This latter situation may occur, for example, if the requesting node had previously obtained the cache line in the exclusive state, had never modified it, but instead had invalidated it without notifying the MSU.

When it is determined that a response may be returned to the requesting processing node, TTQ generates the response using the cache line state information. As discussed above, this response includes the original transaction-tracking id provided with the request, any requested data, and a response type. If data is returned, this response type indicates the state in which the cache line is being provided. This response is stored within response out queue 212, and will be transferred to the appropriate port so that it may be forwarded to the processing node that initiated the request. In the current example, the response is transferred to response output queue 222A of port 1 107A. This request is then forwarded to processing node 1, 105A, when it gains priority.

After a response has been queued within the appropriate one of the response output queues and any memory updates have occurred, the respective one of state machines 206 indicates that the request processing is completed. The request is removed from TTQ 204 such that another request may be received in its place.

As noted above, in some cases, a snoop request must be issued to another processing node before a response may be issued to the requester. This occurs, for example, when the MSU cannot return the cache line in the required state. For example, if the request type indicates, or if state calculation logic 220 determines, that the cache line should be returned in the exclusive state, and if a valid copy of the cache line resides within another processing node, a snoop request must be generated. This request is issued to invalidate the cache line copy residing within that other processing node, and to prompt the return of any modified data.

If a snoop request is necessary, TTQ 204 generates the request, which is stored within snoop request out queue 214. This request includes a transaction id generated by TTQ 204, a snoop request type, and an address. The request is transferred to the snoop request output queue(s) of the appropriate port(s) based on the processing node(s) that have a copy of the requested cache line. In the current example, it will be assumed that processing node N 105B owns the requested cache line. The snoop request is therefore transferred to snoop request output queue 224B of port N 107B. A similar queue is provided for each of the other ports. This request is transferred to SNC 102B to be processed in the manner discussed above.

Eventually, processing node N 105B will return a snoop response to snoop response input queue 226B of port N 107B. This snoop response is provided to select logic 228, which selects one of the pending responses for presentation to TTQ 204 using a rotational fairness algorithm. This selected snoop response will be assigned to the state machine that is still processing the initial request using the transaction id that was included with the snoop request and returned with the snoop response.

After the snoop request is provided to the appropriate one of state machines 206 within TTQ 204, it may be used to immediately generate a response to the requester. This is possible if the snoop response returned data, and if the response type can be determined without another reference to directory 101. If this is the case, the state machine generates a response that is stored within response out queue 212. This response includes the cache line data returned from port N 107B along with a response type indicating the state of the cache line. This response will be transferred to the response output queue 222 of the appropriate port in the manner discussed above. In the current example, the response is transferred to response output queue 222A of port 1, 107A, so that it can be forwarded to processing node 1, 105A.

In addition to generating a response to the requesting processing node, the state machine further generates a request entry within storage queue 210. This request, which will be processed on a FIFO basis as discussed above, will store the updated data returned from processing node 105B to data store 103. This request entry within storage queue 210 will also initiate a read operation to read the cache line state information from directory 101 onto lines 221. State calculation logic uses the current cache line state information as well as the request type and the snoop response type provided by TTQ 204 on lines 218 to update the cache line state information, including a Read Conditional Response (RCR) value contained within the cache line state information. The updating of this information, as well as the use of the RCR value, will be discussed further below. This new cache line state information is stored back to directory 101 on lines 219.

After the modified data has been stored to data store 103 and the cache line state information has been updated, the original request is removed from TTQ 204. This allows TTQ 204 to receive another request from one of the ports based on the fairness algorithm practiced by select logic 202.

The foregoing paragraphs assume that data was returned with the snoop request. This will only occur, however, if a processing node that had ownership of the cache line had actually modified the cache line data. In all other instances in which the cache line was not modified, the snoop response will only return ownership, or, if the cache line had been retained in the shared state, indicate that invalidation had been completed. In this case, the response can only be fulfilled after the data is retrieved from data store 103. Therefore, an entry is generated within storage queue 210. When the request entry gains priority, the requested cache line is read from data store 103 on lines 215, and is used by the associated state machine to generate a response in response out queue 212.

When the response has been generated within response out queue 212, it is transferred to response output queue 222A to be provided to processing node 105A in the current example. The request processing is then considered complete, and the request may be removed from TTQ 204 so that another request may be received.

The foregoing description illustrates one embodiment of a multi-processor system that uses a directory 101 and the associated control logic to maintain memory coherency. Because all memory requests are routed through TTQ 204 to obtain access to data store 103, and because directory 101 is a large memory that introduces some latency, the time required for TTQ to obtain cache line state information and determine the manner in which a request is to be fulfilled may not necessarily be insignificant.

According to the current invention, the system of FIG. 3 further includes acceleration cache logic 120. This logic provides an accelerated path for processing requests. The accelerated path is used in conjunction with the non-accelerated directory path that is described above to reduce the latency associated with some types of request processing. This is accomplished as follows.

When a request is selected by select logic 202 and stored within TTQ 204, it is also provided on lines 230 to acceleration cache logic 120. If the request is of a type that could potentially result in the issuing of a snoop request, the cache line address that is provided with the request is used to determine whether acceleration logic 120 stores state information for the cache line. If so, acceleration cache logic 120 returns this information to TTQ 204 on lines 232 well in advance of when that information would otherwise be available from directory 101. TTQ 204 is then able to determine if a snoop request is necessary, and if so, which processing node(s) should receive that request. The appropriate snoop request can be generated and stored within snoop request out queue 214 so that it can be provided to the appropriate processing node(s) in the manner discussed above. When the original request is finally presented to directory 101 from storage queue 210 using the non-accelerated path, TTQ 204 will prevent a second snoop request from being issued if the snoop request was already initiated by acceleration cache logic 120.

When a snoop response is returned to MSU 100, it is processed in the manner described above. Any data provided with the response will be returned to the requesting processing node and will further be written to data store 103. If data is not provided with the snoop response, it will be retrieved from data store 103, and returned to the requester as discussed above. Finally, cache line state information stored within directory 101 will also be updated by state calculation logic 220 using the snoop response type and the prior cache line state information. When a directory entry is updated, state calculation logic 220 will further prompt the updating of any associated entry within acceleration cache logic 120.

According to one embodiment of the invention, acceleration cache logic 120 stores cache line state information for cache lines that are in one or more predetermined cache line states. In a particular embodiment, acceleration logic stores state information for only those cache lines that are in the exclusive state. Specifically, each time state calculation logic 220 determines that a cache line is transitioning to, or remaining in, the exclusive state, state calculation logic provides cache line state information on lines 234 to acceleration cache logic 120. This causes acceleration cache logic to perform an operation that may cause the cache line state information to be stored within acceleration cache logic. Conversely, if a cache line is transitioning from the exclusive state to another state such as "shared" or "MSU own", state calculation logic 220 provides signals on lines 234 to cause acceleration cache logic 120 to delete any entry that may be stored for that cache line. A detailed discussion concerning the updating of cache line state information is provided below.

The described embodiment of the invention tracks cache lines that are in the exclusive state since requests for these cache lines may require the issuing of a snoop request. The use of acceleration cache logic allows these snoop requests to be issued in an expedited manner so that requests can be fulfilled more quickly. Details associated with the acceleration cache logic 120 can be understood in reference to the remaining drawings.

Figure 4:
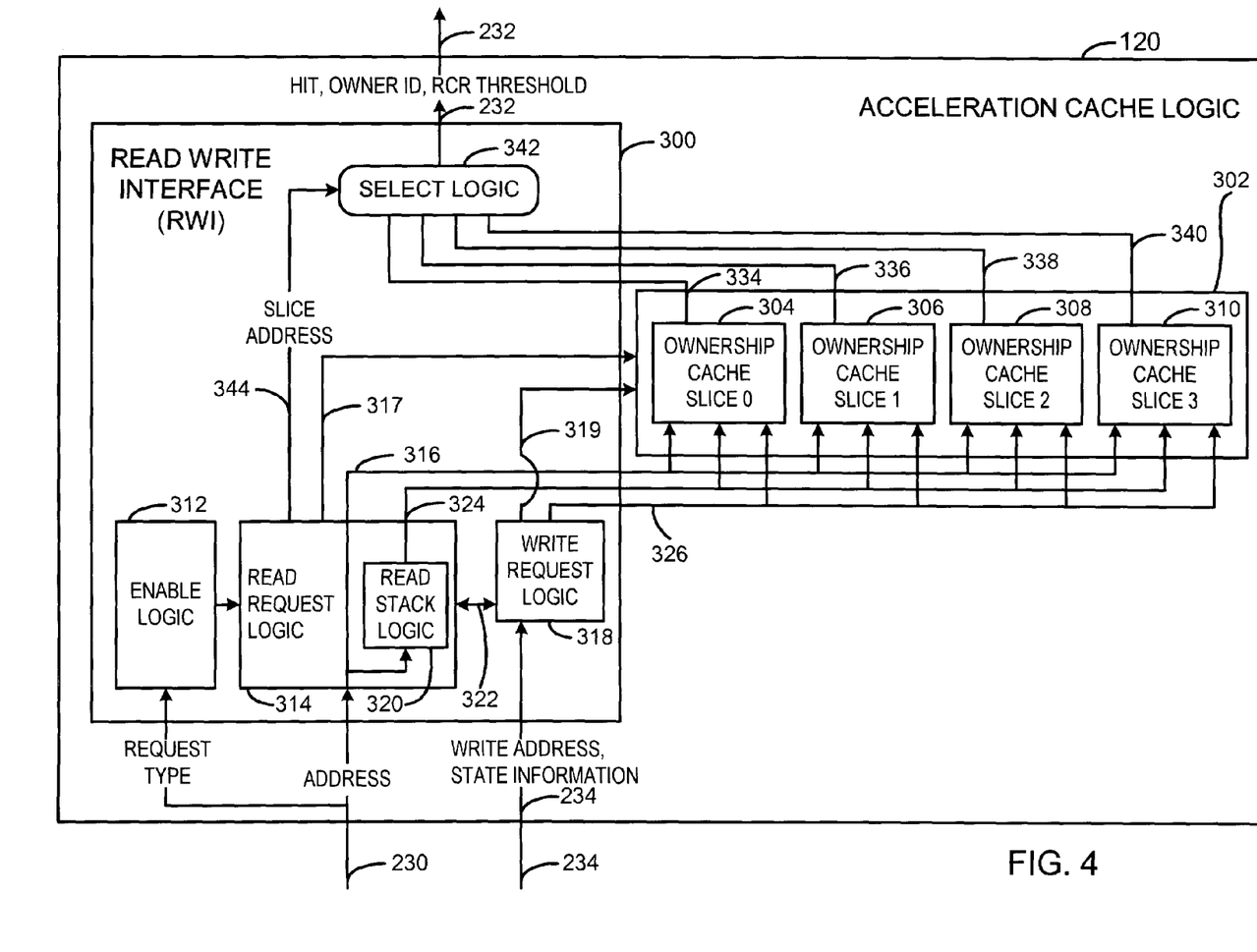
FIG. 4 is a system block diagram of the acceleration cache logic.

FIG. 4 is a system block diagram of acceleration cache logic 120. Acceleration cache logic 120 includes a Read Write Interface (RWI) 300, which controls presentation of requests to an ownership cache 302. The ownership cache 302 stores a subset of the state information retained by directory 101. As discussed above, in one embodiment of the invention, ownership cache 302 stores cache line state information for cache lines that are in the exclusive state. In another embodiment, state information for other cache lines may be stored within ownership cache 302 instead of, or in addition to, state information for those cache lines that are in the exclusive state.

Ownership cache 302 of the current embodiment is divided into four "slices" which are individually addressable. These slices are shown as slice 0, 304, slice 1, 306, slice 2, 308, and slice 3, 310. Each slice includes random access memory (RAM) to store state information for a predetermined number of cache lines. More than one slice may be processing a request simultaneously, as will be discussed below.

Acceleration cache logic 120 receives both read and write requests. As discussed above, read requests are received directly on lines 230 from select logic 202 (FIG. 3). When a request is received, it will be provided to enable logic 312. Enable logic 312 determines whether the request is of a request type that will require a snoop request. If so, acceleration cache logic 120 will process the request. Otherwise, the request will be processed via the non-accelerated directory path.

In the current embodiment, requests may be of the following types:

Code Read—This type of request retrieves a copy of a cache line in the shared state. Generally this request type is used to retrieve instructions, since a code bank will not typically be modified during run time.

Operand Read—This request seeks access to a cache line including operand data. The state in which the cache line will be returned to the requester will be determined by state calculation logic 220 based, in part, on a RCR value that is included within the cache line state information for the requested cache line, as will be discussed further below. To fulfill the request, the MSU may have to issue one or more snoop requests.

Operand Read for Ownership—This request indicates that the requested cache line data is to be returned in the exclusive state. The MSU must honor this request. To do so, the MSU may have to issue one or more snoop requests.

Operand Ownership Only—An operand ownership only request indicates that the MSU is to return ownership, but not data, to the requester. This type of request is used when a cache line is initially obtained in the shared state and it is subsequently determined that ownership must be obtained so that the cache line may be modified.

I/O Purge and Get Ownership—This is a request type issued on behalf of I/O modules. It indicates that the MSU is to issue one or more snoop requests to invalidate any other copies of the cache line. Ownership, but not data, is then returned to the I/O module. This request is generally issued so that the cache line may be overwritten during an I/O operation.

Flush Cache Line—A request of this type flushes a cache line from wherever it resides within the system back to the MSU. When a MSU receives a request of this type, the MSU may have to issue one or more snoop requests to accomplish this flush operation. The state of the cache line will transition to MSU own.

Processor Write Invalid—This request is used to return cache line ownership and the latest modified data back to the MSU. The cache line state transitions to MSU own.

Processor Write Exclusive—This request type is used to return the latest data of a cache line back to the MSU without relinquishing ownership. This command is provided to support an embodiment having non-inclusive third-level caches that may age out a cache line that is still retained by another cache within the processing node.

Processor Write Shared—This request type is used to return the latest modified data and ownership to the MSU. The previous owner retains a copy of the cache line for read-only purposes.

I/O Write Invalid—A request of this nature is used to return ownership of unmodified cache line back to the MSU.

Cache Line Replace—This request is used to announce that a cache line is no longer being held by the requester. The requester does not expect a response back from the MSU when this type of request is issued.

I/O Snapshot Read—This request is used to fetch a current copy of a cache line. It does not change the cache line state anywhere in the system. That is, any cache memory that has already obtained the cache line may still retain it in the same state. A snoop request may have to be issued to fulfill this type of request, which is generally issued by an I/O module.

In the current embodiment, enable logic 312 will therefore enable processing for the following types of requests that may result in the issuance of a snoop request:

Operand Read;
Operand Read for Ownership;
I/O Purge and Get Ownership;
Flush Cache Line; or
I/O Snapshot Read.

The forgoing will be understood to be an exemplary embodiment only, and other embodiments may utilize one or more other types of requests to enable use of the acceleration path.

If a request is of a type that will be processed by acceleration cache logic 120, enable logic 312 enables read request logic 314 to receive the request. In most cases, the request will be provided directly to ownership cache 302 on lines 316. In some cases, however, a request will "conflict" with another request that is being processed by write request logic 318. This means that both the read and write requests reference the same slice of the ownership cache, as may be detected using interface 322. When a conflict is detected, the request being processing by write request logic 318 takes priority over the read request, and the request on lines 230 must be stored temporarily in read stack logic 320.

Read stack logic 320 is a First-In, First-Out (FIFO) queue. The oldest request stored within read stack logic will be provided on lines 324 for processing by ownership cache 302 whenever a clock cycle is available that does not involve a conflict of the type discussed above. In the current embodiment, read stack logic includes four register stages. A request advances to a next one of the four stages each cycle of the system clock. Therefore, for a given request, five clock cycles exist during which the request is available within read request logic 314 for processing by ownership cache 302. Thereafter, the request is lost. This is considered acceptable, since even in the rare case that a high conflict rate causes loss of a request within the acceleration cache logic 120, that request will never the less be processed via the non-accelerated path using storage queue 210 in the manner discussed above.

After a request has been selected for processing, read request logic 314 employs a portion of the request address to select a slice of the ownership cache 302. This "slice address" portion of the request address is used to generate a respective enable signal to enable the addressed one of the slices to receive the request. For ease of reference, the various enable signals are shown provided collectively to ownership cache 302 as signals 317. It will be understood, however, that a respective enable signal is provided to each of the ownership cache slices.

The cache line address will further be used to determine whether a cache hit occurred to the selected slice, as will be discussed below. If so, a cache hit indication and associated cache line state information will be provided on output lines 334, 336, 338, or 340 for a selected one of slices 0, 304, slice 1, 306, slice 2, 308, or slice 3, 310, respectively. One of these sets of output lines will be selected by select logic 342 based on the slice address provided on lines 344. This allows the cache line state information to be provided to TTQ 204 on lines 232.

The information provided to TTQ 204 on lines 232 includes the "owner ID" that indicates the current owner of the requested cache line, and further includes other state information such as "RCR threshold" indicator. Both of these fields are used by TTQ 204 to generate a snoop response so that ownership and, if necessary, cache line data, can be returned in an expedited manner in accordance with the current invention. This will be discussed further below.

In addition to controlling the reading of information from ownership cache 302, RWI 300 further controls the modification of cache line state information stored within ownership cache 302 as follows. Recall that state calculation logic 220 (FIG. 2) receives cache line state information from directory 101 each time a cache line is accessed within data store 103. State calculation logic updates this cache line state information based, in part, on a request type provided from TTQ 204 on lines 218, and in some instances, based on an RCR value provided with the cache line state information, as will be discussed further below. State calculation logic writes the updated state information back to directory on lines 219.

In addition to generating updated state information, state calculation logic monitors the cache line state transitions that are occurring for each requested cache line. In general, three types of cache line state transitions will cause state calculation logic 220 to provide signals on lines 234 that will, in turn, prompt write request logic 318 to initiate a write operation to ownership cache 302. In a first scenario, state calculation logic detects that a requested cache line is transitioning to the exclusive state from some other state. In response, state calculation logic 220 provides address and state information for the requested cache line on lines 234. Write request logic 318 uses this information to initiate a request on lines 326 that may result in the cache line state information being stored within ownership cache 302. In a second case, state calculation logic 220 detects that a requested cache line is remaining in the exclusive state, but ownership is changing from one processing node to another. State calculation logic 220 therefore provides the cache line address and updated state information, including the new owner ID, on lines 234. If an entry exists within ownership cache 302 for the cache line, write request logic 318 updates the entry to include the new owner ID and any other state changes indicated by state calculation logic. Finally, in a third instance, state calculation logic 220 detects that a cache line is transitioning from an exclusive state to some other state. In this case, state calculation logic provides the cache line address and an invalidation indication on lines 234. In response, write request logic 318 generates a request on lines 326 to delete any entry for that cache line that is stored within ownership cache 302.

In any of the foregoing scenarios, write request logic 318 enables an appropriate slice of ownership cache to receive a write request. As was the case with read requests, this is accomplished by decoding the slice address to generate an enable signal to activate the addressed one of the ownership cache slices. For ease of reference, these enable signals are shown collectively as signals 319, which are provided to ownership cache 302. It will be understood, however, that a respective enable signal is provided by write request logic 318 to each of the ownership cache slices for this purpose.

As discussed above, the slices within ownership cache 302 are individually enabled. During a read operation, enable signals 317 are used to enable an addressed one of the slices to receive a read request. Similarly, during a write operation, write enable signals 319 are used to enable an addressed one of the slices to receive a write request. This allows a first slice to process a read request while another slice handles a write request, thereby increasing the number of requests that can be processed in a given period of time by acceleration cache logic 120.

Figure 5:
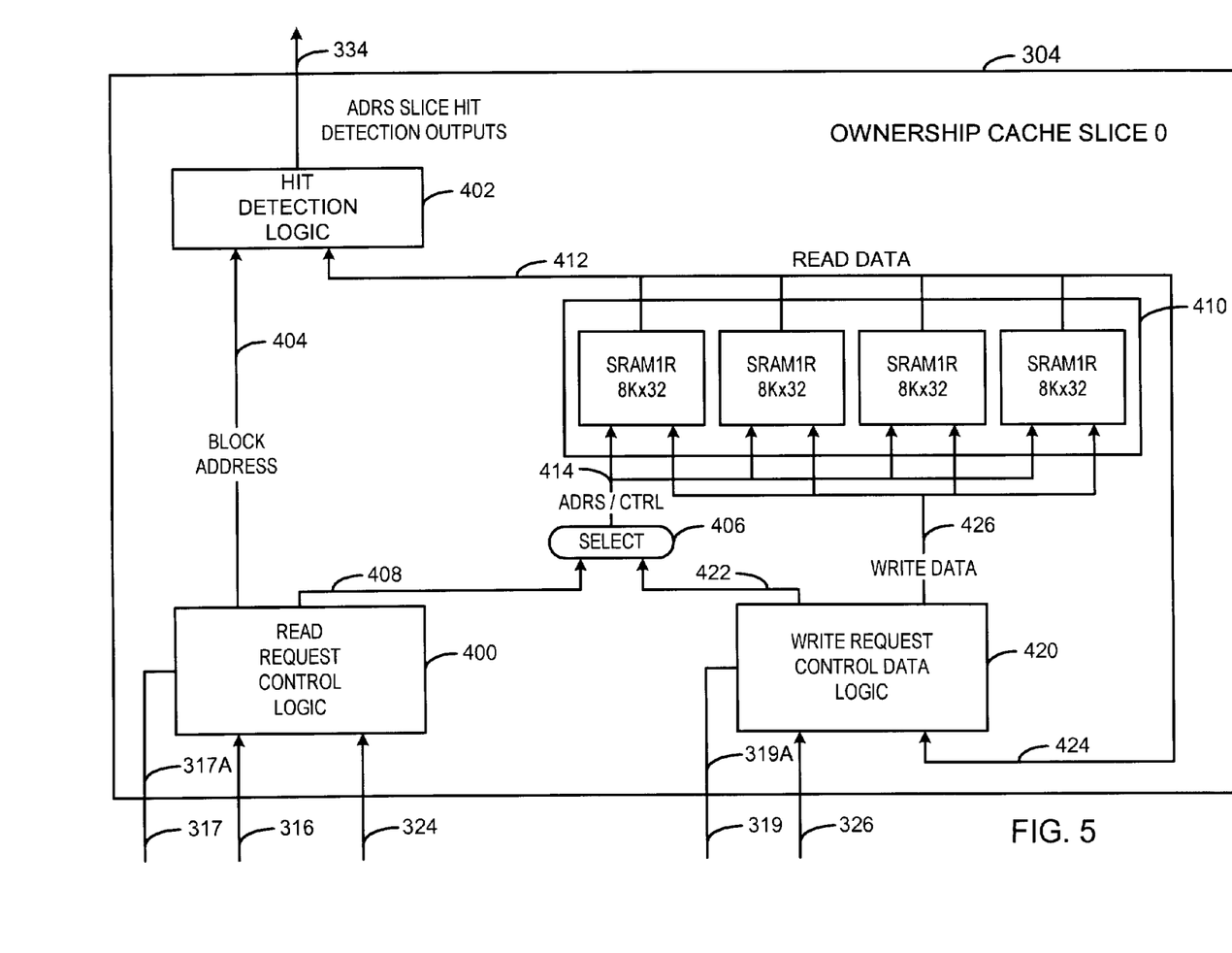
FIG. 5 is a logic block diagram of a slice of the ownership cache.

FIG. 5 is a logic block diagram of a slice of ownership cache 302. Although ownership cache slice 0, 304, is shown and described, the following discussion applies equally to the other ownership cache slices. As discussed above in regards to FIG. 4, a request to read data from slice 0 may be provided directly from select logic 202 (FIG. 3) to slice 0 on lines 316. In some instances, a conflict may occur that requires a request to be stored temporarily within read stack logic 320, and thereafter provided to slice 0 on lines 324. In either case, the requests are made available to read request control logic 400. If requests are available on both paths, read request control logic will select one of the requests for processing based on a predetermined priority scheme. In the current embodiment, the earlier, stored requests are given higher priority over the requests that are not stored.

Read request control logic 400 also receives an enable signal 317A, which is shown being provided to ownership cache 302 with signals 317 of FIG. 4. This slice enable signal enables read request control logic 400 if slice 0 is addressed by the cache line address. Other slices are enabled in a similar manner by their respective enable signal.

If the current request is directed to slice 0, read request control logic 400 provides a second portion of the cache line address to hit detection logic 402 on lines 404. This address portion, referred to as the "block address", will be used to detect any cache hit in a manner to be described below. A third "set address" portion of the request address is provided to select logic 406 on lines 408. The set address will be used to address a memory bank 410, which in the current embodiment includes four RAMs. In another embodiment, other memory bank configurations may be used.

During a read operation, the set address provided on lines 414 is used to read data signals from memory bank 410 onto lines 412. These data signals include multiple block addresses, as will be discussed further below. Each of these block addresses is compared against the block address on line 404 to determine whether a cache hit occurred. If a cache hit did result, state information for the requested cache line is stored within the ownership cache. As such, this state information is provided on lines 334 to TTQ to be used in generating a snoop request. This state information includes the owner ID and an RCR threshold value for the requested cache line, as will be discussed below.

During a read operation, the data read from memory bank 410 is provided to write request control data logic 420 on path 424. If a parity error is detected on the read data, write request control data logic 420 performs a predetermined recovery action. This recovery action involves scrubbing the error from memory bank 410, as will be discussed below.

In addition to receiving requests to read information from ownership cache slice 0, ownership cache slice 0 may further receive signals on lines 326 from state calculation logic 220 to initiate write operations to the ownership cache. The request signals, which include a cache line address and updated state information, are provided to write request control data logic 420. Write request control data logic 420 also receives an enable signal 319A, which is shown included with enable signals 319 in FIG. 4. Enable signal 319A enables write request control data logic 420 if the slice address portion of the cache line address is addressing slice 0.

If write request control data logic 420 is enabled, the set address portion of the cache line address will be provided to select logic 406 on lines 422. These signals will initiate a read-modify-write operation that reads data signals onto lines 412 and directs these signals to write request control data logic 420 on path 424. Using state information provided by state calculation logic, including an owner ID indicating the next owner of the cache line, and additional state information to be discussed below, write request control data logic 420 may update the data signals provided on path 424. This updated state information may then be provided on lines 426 and stored to memory bank 410, as will be discussed further below.

The foregoing operations can be better understood by considering the format of the state information that is stored within ownership cache. This is discussed in reference to the following drawing.

Figure 6:
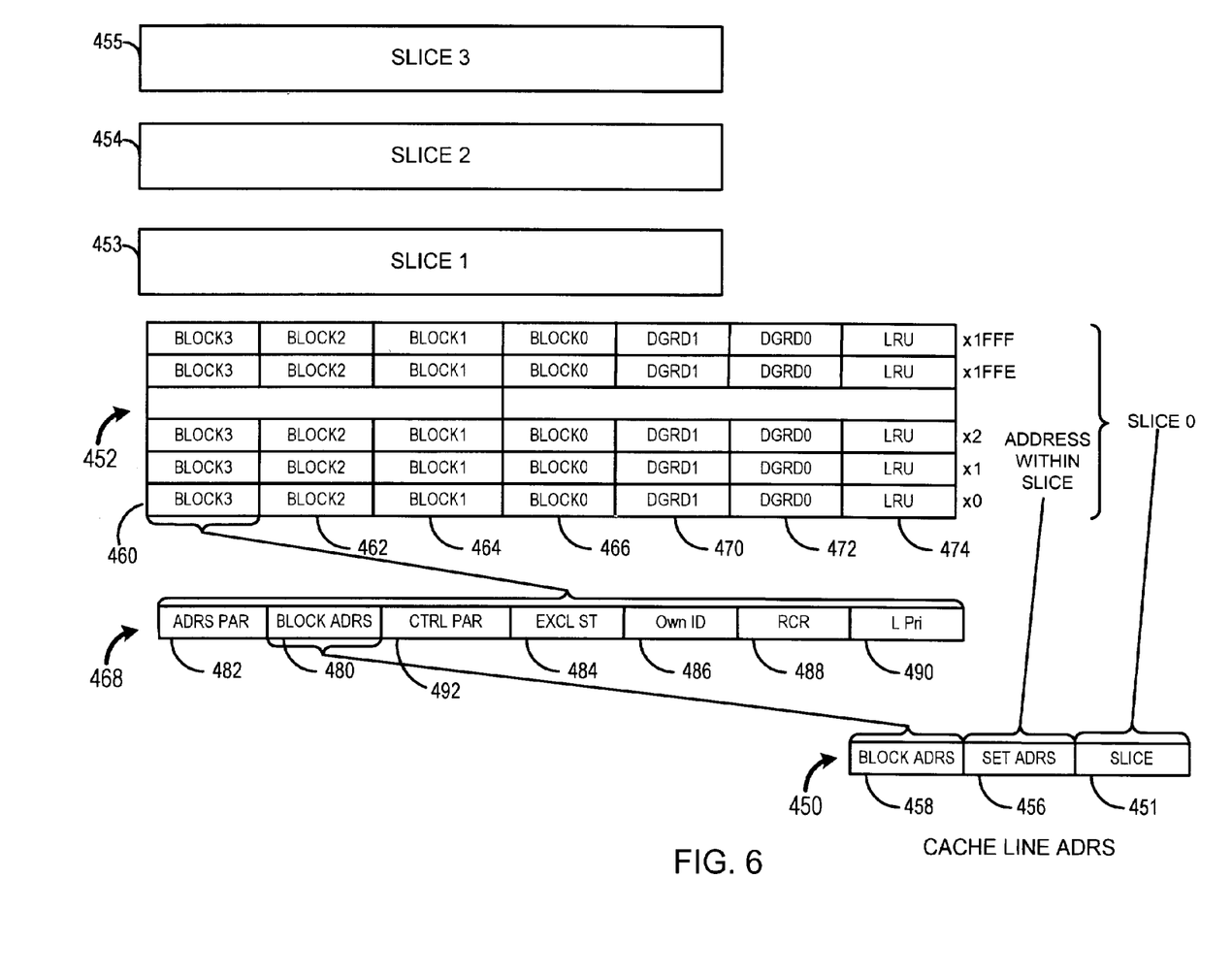
FIG. 6 is a diagram illustrating the format of data stored within the ownership cache.

FIG. 6 is a diagram illustrating the format of data stored within ownership cache 302. The ownership cache 302 is addressed using the most significant bits of a cache line address that is provided with the request. The way in which these address bits are used is illustrated by block 450. In a current embodiment, the address is divided into three address portions. A two-bit address field 451 is used to select one of the four memory slices. In FIG. 6, the address space for slices 0 through 3 are represented by blocks 452 through 455, respectively. Another portion of the cache line address, shown as set address field 456, is used to address a location within a selected slice. Finally, a third "block address" portion 458 is used to determine whether a cache hit occurred. The use of the cache line address fields can be best understood by returning to FIG. 5.

In FIG. 5, the slice address field 451 is used to enable read request control logic 400 for a particular slice during a read operation, and is further used to enable write request control data logic 420 during a write operation. The set address field is provided to select logic 406 for use in accessing an addressable location within memory bank 410 of a particular ownership cache slice. Block address field 458 is provided to hit detection logic 402 on lines 404 for comparison against data that is read from the addressed location of the selected slice. If a favorable compare results, a cache hits has occurred, indicating that valid state information is available within ownership cache 302 for the currently requested cache line. This will be discussed further below.

Next, the formatting of the information within ownership cache 302 is considered. As is shown for slice 0, each addressable location is formatted in a like manner. Each location includes fields for four entries. For addressable location X0 of slice 0, these entries are shown as "block 3" 460, "block 2" 462, "block 1" 464, and "block 0" 466. Each of these entries includes state information for a respective cache line of memory. The specific format of an entry is shown in block 468, and will be discussed below.

Each addressable location within a slice further includes two degrade fields shown as "dgrd1" field 470 and "dgrd0" field 472 for addressable location X0. In one embodiment, dgrd1 field 470 includes a respective bit for each entry 460 through 466. If a parity error occurs when reading information from any of these entries, a respective degrade bit within dgrd1 field 470 may be set to indicate that use of the corrupted entry is to be discontinued. State information will no longer be stored within the corrupted entry after the respective degrade bit is set. This will decrease the size of the ownership cache. In one embodiment, degradation of entries in this manner may be selectively disabled, as will be discussed below. Dgrad1 field 470 includes a parity bit so that corruption of this degrade field can be detected.

The second degrade field shown as dgrd0 field 472 is provided to store a redundant copy of the data stored within the dgrad1 field 470. Data stored within dgrad0 field 472 will be used instead of that stored in the dgrad1 field 470 if a parity error is detected on the data stored in the dgrad1 field. If both degrade fields fail, both fields are re-initialized to a predetermined value. In addition, after the parity error is detected, a predetermined recovery action is taken for the addressable location, as will be discussed below.

Each addressable location within a slice further includes a Least Recently Used (LRU) field, shown as LRU field 474 for addressable location X0 of slice 0. The LRU field indicates the relative age of the information stored within entries 460 through 466. In one embodiment, the LRU field includes six bits. Three of the bits indicate the relative age of the information stored within block 0 entry 466 as compared to the age of information stored within block entries 460 through 464. Two additional bits indicate the relative age of state information stored in block 1 entry 464 as compared to information stored within block entries 460 and 462. The remaining bit of LRU field 474 indicates the relative age of the information stored within block 3 entry 460 as compared to the information stored within block 2 entry 462. Using the information stored in LRU field 474, it can be determined which entry stores the oldest information so that, if necessary, that information can be aged from the cache, as will be discussed further below.

Next, the formatting of entries 460 through 466 is discussed. Although the formatting for block 3 entry 460 is shown and discussed in reference to FIG. 6, it will be appreciated that entries 462 through 466 are formatted in a like manner. According to one embodiment of the invention, format 468 is employed. This format includes field 480 to store a block address. An address stored in field 480 will be compared to the block address in field 458 for the requested cache line to determined whether a cache hit occurred. As discussed above, this comparison is performed by hit detection logic 402 of FIG. 5. Field 480 is parity protected by address parity field 482. If a parity error occurs when reading the block address from field 480, a respective degrade bit included within both dgrd1 field 470 and dgrd0 field 472 may be set, as will be discussed further below.

Block 3 entry 460 further includes an exclusive state field 484. This one-bit field is set if valid cache line state information is stored within block 3 entry 460 for a corresponding cache line that is currently in the exclusive state. If this bit is cleared, the block 3 entry 460 is not currently storing valid cache line state information, and if not in the degraded state, is considered available to store a new cache line entry.

Also included in entry 460 is an owner ID field 486, which stores a six-bit identifier indicating the identity of a processing node or I/O module that stores the associated cache line. A Read Conditional Response (RCR) threshold field 488 is provided to indicate, for certain types of responses, whether cache line data should be provided to a requester in a shared or an exclusive state. A detailed discussion of the RCR threshold field will be provided below.

Finally, a low priority entry sub-field 490 is provided. This one-bit sub-field indicates when entry 460 is to be considered low priority and may be a candidate for aging from the ownership cache. The use of the low priority field is predicated on the assumption that ownership cache 302 provides the greatest benefit when it stores state information for those cache lines that frequently change ownership. As discussed above, some cache lines contain data likely to be modified by multiple processing nodes within the system. Because of this, one processing node may have to gain ownership of the cache line by taking ownership away from another processing node. This may disrupt the processing activities of the former owner, and introduces latency in the processing activities of the new owner. Moreover, this process of acquiring ownership, then later relinquishing ownership to another processing node, may be repeated many times for a cache line containing data shared by multiple processing nodes. To ensure latency is minimizes in these types of circumstances, it is desirable to track state information for those cache lines having a history of changing owners. Thus, a high priority entry is created within ownership cache 302 for any cache line that is owned by a first processing node, then subsequently requested in the exclusive state by a second processing node.

In contrast to the foregoing scenario, some cache lines store data that is primarily updated by processors within a single processing node. Most other processing nodes require the cache line data for read purposes only. In these types of situations, the memory thrashing problems discussed above are less likely to occur. As such, it is not as critical to store state information for these cache lines within ownership cache 302. Therefore, when a cache line transitions to the exclusive state from either the shared or MSU owns state, a low priority entry is created within ownership cache 302. This is accomplished by setting the designator stored in low priority field 490. Low priority field 490 is used in conjunction with information stored in LRU field 474 to determine how entries are to be aged from the cache, as will be discussed below.

Finally, block 3 entry 460 includes a control parity field 492, which provides parity on fields 484 through 490, respectively. If a parity error is detected on these fields, a predetermined recovery action is initiated, as is discussed below.

Next, the creation of an entry within ownership cache is considered in more detail. When state calculation logic 220 determines that the state of a cache line is either transitioning to the exclusive state, or is remaining in the exclusive state but changing owners, state calculation logic 220 will provide information on lines 234 indicating that a new entry may have to be entered within ownership cache 302. This information will include an indication as to whether any cache line entry is to be considered high priority, and further includes additional state information to be discussed below.

When the information provided by state calculation logic 220 is forwarded to write request control data logic 420 (FIG. 5), a read-modify-write operation is initiated for the address that corresponds with the requested cache line in the manner described above. Data is read from the addressed location of a selected slice and is provided on lines 412 and 424 to write request control data logic 420. Write request control data logic 420 employs exclusive state field 484 of each entry 460 through 466 to determine whether any entries are unused. If so, the new entry is created in a predetermined one of these unused fields using an entry selection mechanism. The block address from the current cache line address is recorded in block address field 480. Parity is generated on the address and stored within address parity field 482. The exclusive state field 484 is set to indicate the entry is now storing valid data. The owner ID field 486 stores the node identifier for the processing node that is making the current request. RCR threshold field 488 is set to a one-bit identifier provided by state calculation logic, as will be discussed below. Low priority field 490 is set according to the priority indication provided by state calculation logic 220. Parity is generated on sub-fields 484 through 490, and is stored in control parity field 492. Finally, LRU field 474 is updated to indicate the relative ages of the entries.

The foregoing assumes that an entry is available within ownership cache 302 at the location of the selected slice, as addressed by the cache line address. If this is not the case, an aging process is used by write request control data logic 420 to determine which entry will be aged from cache. If the new entry is considered low priority as indicated by a designator provided by state calculation logic, and all existing entries are high priority, the new entry will be discarded. If the new entry is high priority, and all existing entries are high priority, LRU field 474 will be used to age the oldest entry from ownership cache to make room for the new entry. If the new entry is high priority and one or more entries are low priority, the oldest low priority entry will be aged from cache so that the new entry may be created.

Next, use of the RCR threshold field 488 is described. This field is related to the RCR value that is stored with the cache line state information in directory 101. An RCR value that is stored within the directory is used to determine the state in which a respective cache line should be returned to requesters as follows. In most cases, a cache line is returned to a requester based on the request type that is provided with the request. For example, if a request is of a "code read" type, the cache line will be returned to the requester in the shared state. In contrast, if the request is of an "operand read for ownership" type, the cache line is returned to the requester in the exclusive state.

Unlike the request types described above, some requests are not fulfilled based strictly on request type. In particular, in the current embodiment, operand read requests are fulfilled using the RCR value that is stored in directory 101 with cache line state information for the respective cache line. The RCR value, which is updated each time the respective cache line is referenced, indicates a pattern of recent usage for the cache line that dictates the state in which a cache line will be returned to a requester. For example, if the requested cache line has been updated by a recent requester, the RCR value will indicate that the cache line should be returned to the current requester in the exclusive state. In contrast, after the cache line has been returned to requesters in the exclusive state a predetermined number of times without being modified, the RCR value will indicate that the cache line should thereafter be provided in the shared state. The cache line will be provided in the shared state until it is modified, at which time the cache line will thereafter be provided in the exclusive state, and so on.

As discussed above, a new RCR value is generated each time the respective cache line is referenced. The new value is based, in part, on the request type, the previous RCR value, and the current state of the cache line. The specific mechanism used to generate the RCR value is largely beyond the scope of the current invention. Details associated with the updating of the RCR value are provided in commonly-assigned U.S. patent application entitled "System and Method for Providing Speculative Ownership of Cached Data Based on History Tracking", Ser. No. 10/304,919, filed on even data herewith, and incorporated herein by reference in its entirety.

As will be appreciated, when the non-accelerated path is used to satisfy a memory request, the RCR value of the requested cache line may be used to determine the type of any snoop request that is needed to fulfill the request. For example, if an RCR value indicates a current operand read request is to be fulfilled by returning the cache line in the shared state, a "port snoop line data" request is issued to the current cache line owner. This type of snoop request causes the current cache line owner to return any modified cache line data, but allows the processing node to retain a copy of the cache line for read-only purposes. In contrast, if the RCR value indicates the operand read request is to be fulfilled by returning the cache line in the exclusive state, a "port snoop invalidate line" snoop request must be issued. This snoop request forces the current owner to return any modified copy of the data and to further relinquish cache line ownership and invalidate all cache line copies.

Because the RCR value of a cache line determines the type of snoop request that will be issued to fulfill operand read requests, acceleration cache logic 120 must have some visibility into the RCR mechanism. This visibility is provided by the RCR threshold value, which is generated by state calculation logic 220 and forwarded on lines 234 to acceleration cache logic 120. As noted above, this value is stored as field 488 within each of the entries 460 through 466. In the current embodiment, the single-bit RCR threshold value indicates, based on the RCR value stored within directory 101, whether the current cache line is to be returned in the exclusive or shared state. If a cache hit occurs and no parity errors are detected, the RCR threshold value is read from ownership cache along with the owner ID and provided on lines 232 to TTQ 204. Depending on the RCR threshold value, TTQ 204 will generate either a "port snoop line data" or a "port snoop invalidate line" snoop request to the appropriate owner.

As discussed above, when data is read from one of the ownership cache slices in the manner discussed above, parity bits are used to determine whether a fault has occurred. Returned to FIG. 5, data read from memory bank 410 is provided to write request control data logic 420 on path 424 so that parity checking can be performed. If a parity error is detected on either a block address field or a control field using parity bits stored in fields 482 and 492, respectively, write request control data logic 420 will modify the respective entry.

In one embodiment of the invention, a programmable mode switch is provided to determine how a detected parity error is to be handled. In a first mode, a detected parity error results in degrading a respective block entry so that it is no longer considered usable. This is accomplished by setting a respective degrade bit in dgrd1 field 470 and dgrd0 field 472, as described above. In another mode, the block entry is reinitialized to a predetermined initialization value and is still considered usable.

Write request control data logic 420 may further include one or more counters to track error occurrences. If a predetermined error threshold is reached, write request control data logic 420 may reinitialize an entire slice. Alternatively, the slice may be disabled, thereby removing one-fourth of the capacity of ownership cache 302. The accelerated ownership mechanism is therefore not available for addresses within the disabled slice. In still another mode, a particular block may be disabled within every addressable location of a slice. For example, use of all "block 3" entries within slice 0 may be disabled by activating a block 3 disable switch, as may be desirable if write request control data logic 420 detects a pattern of errors occurring within these block entries.

The foregoing invention provides an acceleration path for use in fulfilling memory requests within a multi-processing system in an expedited manner. It will be understood that the embodiments and formats described above are merely exemplary and many other alternative embodiments are possible. For example, many systems employing other cache, memory, and processor configurations may usefully employ the current invention. The concepts of the current invention may further be extended to storage devices other than memories. If desired, other types of requests may be employed to trigger use of the acceleration cache logic. An ownership cache could further be modified to store cache lines in any desired state. Various other fault detection and recovery mechanisms may also be employed. For example, error correction codes may be used instead of parity protection, if desired. Alternative mechanisms for aging entries from the ownership cache may be employed. If desired, the degrade mechanism may be replaced with an alternative mechanism or may not be used at all. Thus, the embodiments presented herein are to be considered exemplary only, and the scope of the invention is indicated only by the claims that follow rather than by the foregoing description.

What is claimed is:

1. A data processing system, comprising:
   a first storage device to store data signals;
   at least two requesters coupled to the first storage device to make requests for copies of ones of the data signals;
   a second storage device coupled to the first storage device to store directory signals descriptive of the data signals; and
   acceleration logic coupled to the second storage device, the acceleration logic including a third storage device to retain ones of the directory signals to reduce the time required to fulfill ones of the requests.

2. The system of claim 1, wherein the data signals are organized within the first storage device in predetermined units, wherein the second storage device includes circuits to store respective ones of the directory signals for each of the units, and wherein the acceleration logic includes circuits to store ones of the directory signals for a subset of the units.

3. The system of claim 2, wherein the acceleration logic includes multiple individually addressable storage slices, each to store directory signals for ones of the units that are addressable within a respective predetermined address range of the first storage device.

4. The system of claim 3, wherein the acceleration logic includes circuits to allow a read request to be processed by any of the storage slices at the same time a write request is processed by a different one of the storage slices.

5. The system of claim 3, wherein the storage slices each comprises a set addressable cache.

6. The system of claim 2, wherein each addressable location of the third storage device stores multiple entries, each entry being capable of storing directory signals for an identified one of the units.

7. The system of claim 6 further including write logic to store directory signals to a selected one of the multiple entries based on a predetermined priority scheme.

8. The system of claim 7, wherein each addressable location includes a Least Recently Used (LRU) value indicating the relative ages of the multiple entries, the LRU value being used to choose the selected one of the multiple entries.

9. The system of claim 8, wherein each of the multiple entries stores an indicator indicating whether the entry is high priority, each indicator within an addressable location being used to choose the selected one of the multiple entries.

10. The system of claim 2, wherein each of the units may be in one of multiple states, and wherein the acceleration logic includes circuits to store directory signals for ones of the units that are in one or more predetermined ones of the multiple states.

11. The system of claim 10, wherein the predetermined ones of the multiple states includes an exclusive state.

12. The system of claim 1, wherein at least one of the requesters is a cache memory.

13. The system of claim 1, wherein each of the requesters issues requests to the first storage device, each request being any one of multiple request types, and wherein the acceleration logic includes logic responsive to requests that are one or more predetermined ones of the request types.

14. The system of claim 13, further including Transaction Tracker Queue (TTQ) logic coupled to the first storage device to issue snoop requests to retrieve data signals from one or more of the requesters, and wherein the one or more predetermined ones of the request types include request types that will result in the issuance of at least one of the snoop requests.

15. The system of claim 14, wherein the acceleration logic includes circuits to provide the TTQ logic with a value indicative of the identity of the one or more of the requesters that are to be issued one of the snoop requests.

16. The system of claim 15, wherein the acceleration logic includes circuits to store a value that indicates to the TTQ logic a type of snoop request to issue.

17. The system of claim 16, wherein the TTQ logic includes circuits to provide any data signals returned as a result of the snoop requests to a requesting one of the requesters.

18. A memory system, comprising:
    a first storage device to store data signals;
    a second storage device coupled to the first storage device to store directory entries, each entry indicating a state of respectively associated ones of the data signals; and
    acceleration logic coupled to the second storage device including a third storage device to store state signals included within predetermined ones of the directory entries.

19. The system of claim 18, wherein the predetermined ones of the directory entries are those being indicative of one or more predetermined states.

20. The system of claim 19, wherein the one or more predetermined states includes an exclusive state.

21. The system of claim 19, wherein the acceleration logic includes write request logic to store ones of the state signals within the acceleration logic when associated ones of the data signals transition to any of the one or more predetermined states.

22. The system of claim 21, wherein the predetermined states include an exclusive state.

23. The system of claim 18, wherein predetermined ones of the state signals are designated high priority.

24. The system of claim 23, wherein the predetermined ones of the state signals are included within ones of the directory entries respectively associated with data signals that were in an exclusive state, that are remaining in the exclusive state, and that are being transferred within the system.

25. The system of claim 18, further including at least two requesters, each coupled to issue a request to the first storage device for ones of the data signals.

26. The system of claim 25, wherein one or more of the requesters is a cache memory.

27. The system of claim 25, wherein each request is any one of multiple request types, and wherein the acceleration logic includes enable logic to enable processing of requests associated with one or more predetermined request types.

28. The system of claim 27, further including Transaction Tracker Queue (TTQ) logic coupled to the acceleration logic to issue snoop requests to one or more of the requesters, and wherein the predetermined ones of the request types include request types that result in the TTQ logic issuing one of the snoop requests.

29. The system of claim 28, wherein the acceleration logic includes logic to provide ones of the stored state signals to the TTQ logic to indicate which of the requesters are to be issued one of the snoop requests.

30. The memory of claim 29, wherein the snoop requests may be any one of multiple types, and wherein the acceleration logic includes logic to provide ones of the stored state signals to the TTQ logic to indicate one of the multiple types of snoop requests to issue.

31. The memory of claim 18, wherein the third storage device includes a storage bank to store the state signals, the storage bank being capable of storing first ones of the state signals simultaneously with reading second ones of the state signals.

32. The memory of claim 31, wherein the storage bank is a set addressable cache.

33. A method of managing data signals that are stored within a first storage device, comprising:
   a.) maintaining state information for each of the data signals in a directory; and
   b.) storing predetermined portions of the state information within acceleration logic to reduce latency associated with accessing data signals described by the predetermined portion of the state information.

34. The method of claim 33, wherein the data signals are stored within the first storage device in addressable data portions, and step a.) includes maintaining respectively associated state information for each of the addressable data portions.

35. The method of claim 34, wherein the predetermined portions of the state information include state information for the addressable data portions that are in one or more predetermined states.

36. The method of claim 35, wherein the one or more predetermined states includes an exclusive state.

37. The method of claim 34, further including:
   determining when state information is changing in a predetermined manner for any of the addressable data portions; and
   storing the state information that is changing in the predetermined manner in the acceleration logic.

38. The method of claim 37, wherein the predetermined manner includes transitioning from a first state to a second state.

39. The method of claim 34, further including:
   determining when state information is remaining within a predetermined state while a respectively associated addressable data portion is being transferred; and
   storing the state information that is remaining within the predetermined state in the acceleration logic.

40. The method of claim 34, further including aging state information from the acceleration logic based on a predetermined priority scheme.

41. The method of claim 33, further including:
   c.) making a request to the first storage device to access requested ones of the data signals; and
   d.) if the predetermined portions of the state information includes state information for the requested ones of the data signals, obtaining the state information for the requested ones of the data signals to allow the request to be fulfilled more efficiently.

42. The method of claim 41, wherein step d.) is only performed if the request is associated with one or more predetermined request types.

43. The method of claim 42, wherein the first storage device is coupled to one or more other storage devices, and further including issuing one or more snoop requests to the one or more of the other storage devices to retrieve a copy of the requested ones of the data signals.

44. The method of claim 43, wherein the one or more predetermined request types includes a request type that will result in issuance of one of the snoop requests.

45. A data processing system, comprising:
   first storage means for storing data signals;
   second storage means for storing directory signals describing states in which the data signals are stored;
   requesting means for issuing requests to access ones of the data signals; and
   acceleration logic means for retaining a subset of the directory signals to be used in processing predetermined ones of the requests in an accelerated manner.

* * * * *